INVENTOR.
CLYDE H. O. BERG

United States Patent Office 3,284,915
Patented Nov. 15, 1966

3,284,915
PROCESS AND APPARATUS FOR THE TREATMENT OF SOLIDS IN VERTICAL KILNS
Clyde H. O. Berg, 5 Euclid Ave., Long Beach, Calif.
Filed Dec. 18, 1963, Ser. No. 331,421
17 Claims. (Cl. 34—10)

This invention relates generally to means and methods for the treatment and conversion of solids. More particularly this invention relates to a new and improved method and continuous vertical kiln apparatus for the uniform heat treatment of coal or coke particles.

Among the most important industrial processes are those involving the heat treatment of particulate solids such as coal, coke, limestone, charcoal, carbon, oil shale, cement clinkers, ores, and other diverse solid materials in crushed, broken, or equivalent discrete state. Many conventional kilns, furnaces, or ovens are of a continuous gravity-flow design, e.g., the vertical shaft kiln. It has been found in the use of the vertical shaft kiln that there are several disadvantageous phenomena which have restricted industrial exploitation. Two of the major problems with prior art devices and methods are the non-uniform heat treatment of the solids and the plugging of the solids during passage through the kiln. Coal or partially treated coke will go through a softening stage during calcining forming "cakes" or agglomerates which interfere with the uniformity of both solids flow and fluid flow in the kiln. Further, when a kiln is conventionally fired by a central firing pipe, the combustion is localized and uneven heating results due to the difficulty of transferring heat from the kiln center to the kiln periphery.

It is accordingly an object of this invention to provide improved means and methods for uniformly distributing fluids through solids in continuous vertical kilns and simultaneously minimizing agglomeration or plugging of solids which are moving by gravity through vertical kilns.

It is an additional object of this invention to provide for the uniform heat treatment of solids in a continuous vertical retort or kiln.

Another object of this invention is to provide for increased solids flow through continuous vertical shaft kilns as compared to conventional vertical heat treating devices.

A further object of this invention is to provide a vertical kiln apparatus which keeps all of the material in the hottest zones in constant movement or agitation so that solids flowing therethrough are treated in the most favorable and uniform manner.

A still further object of this invention is to provide a novel furnace or kiln construction which provides means for breaking up agglomerates which may be formed in the heating or conversion operation.

Another object of my invention is to provide a vertical shaft of efficient and novel construction whose height is substantially reduced as compared to conventional shaft kilns of the same capacity.

Other and related objects will be apparent from the detailed description of the invention and various advantages not specifically referred to herein will be apparent to those skilled in the art on employment of the invention in practice.

I have now found that by the use of precise gas circulation control resulting from an internal recirculating gas stream and by the use of oscillating internal baffles in my kiln apparatus such as that described herein, there is a great improvement in uniformity of fluid contacting, in uniformity of heat treatment, and substantial elimination of plugging while solids, e.g., coal or coke, are travelling vertically through the kiln. Essentially, a preferred embodiment of my invention comprises:

(1) a kiln for calcining a granular solid material which has three main contacting zones, the top section being a countercurrent heat transfer heating zone, the middle section being a cocurrent heat transfer calcining zone, and the bottom section being a countercurrent heat transfer cooling zone;
(2) the creation, by means of internal apparatus, of a void in the center of the kiln at the location of the cocurrent heat transfer calcining zone and the rapid cocurrent circulation of a revolving heating gas stream in this zone by means of either an aspirator, an external motivating fluid, or circulation of the gas stream using a blower or other mechanical means;
(3) the addition of heat to the circulating gas stream in the cocurrent heat transfer calcining zone;
(4) the creation of an oscillating motion of the internal apparatus in the cocurrent heat transfer calcining zone to cause agitation or motion in the solids bed thus breaking up or preventing the formation of agglomerates in the solids flowing continuously or semi-continuously downwardly through the kiln.

The improved continuous vertical heat treating kiln and heat treating method of my invention can best be understood with reference to the accompanying drawings which form a part of this application, and wherein the same numerals are used to designate the same parts throughout the drawings.

It is to be understood that although the vertical kiln and heat treating methods of my invention are particularly applicable to calcining coal or coke, my invention is broadly applicable to the contacting of any downwardly flowing particulate solids with a gaseous fluid stream. Thus, although the continuous vertical kiln and heat treating methods are specifically described in connection with the treatment of coke, the techniques and kiln apparatus can be used to treat other hydrocarbonaceous solids such as gilsonite, oil shale, peat, soft coal, hard coal, and the like as well as other granular organic and inorganic materials such as charcoal, walnut shell, cocoanut shell, carbon, limestone, cement clinkers, ores, and the like. Thus, my invention is particularly suited for the manufacture of activated carbon. The term "granular" is used herein to refer to solid material in the form of pellets, tablets, capsules, spheres, or granules of regular or irregular shape having an obvious particulate form as distinguished from finely divided powders.

Figure 1:
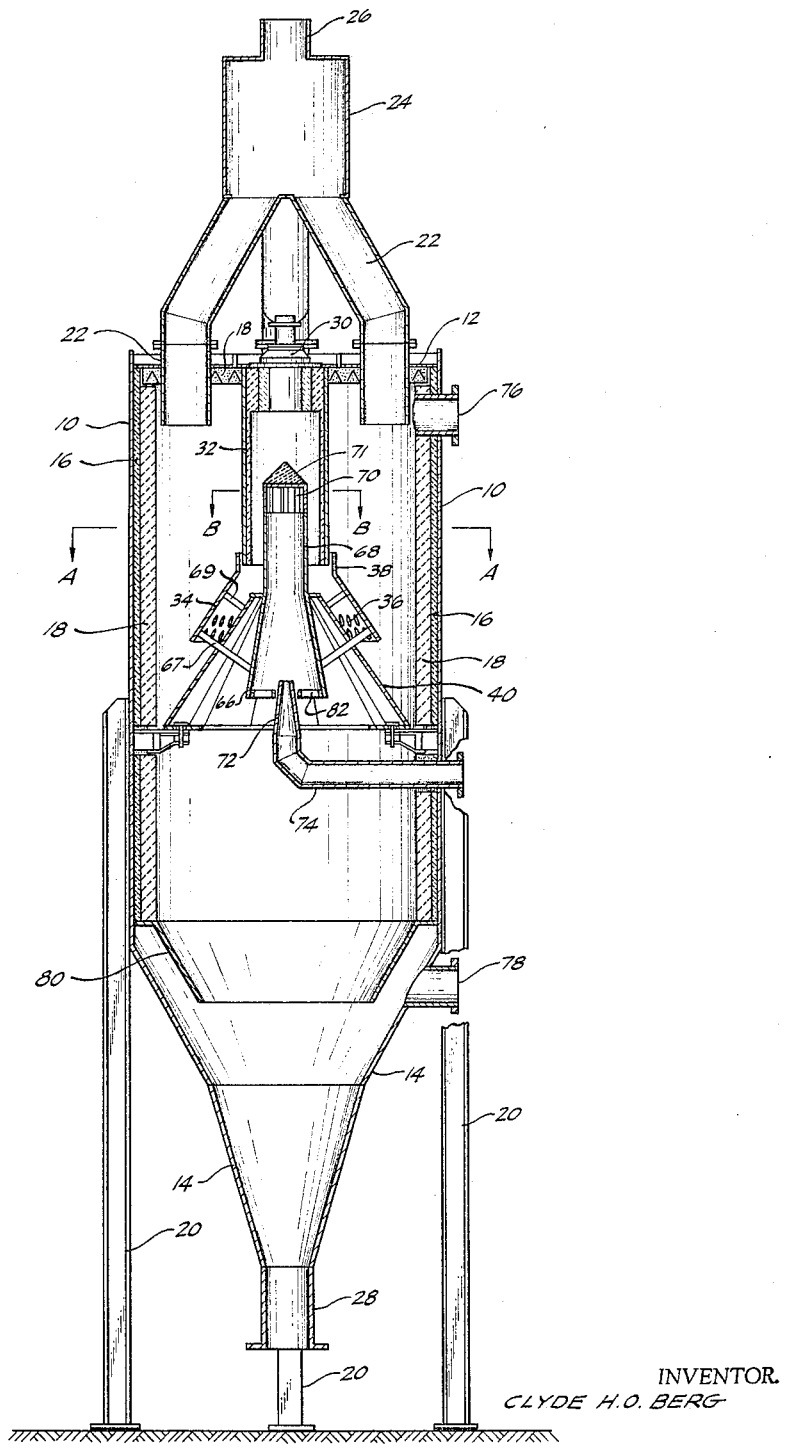
FIGURE 1 is an elevational view in vertical cross-section through a diameter of the kiln of this invention.
Figure 2:
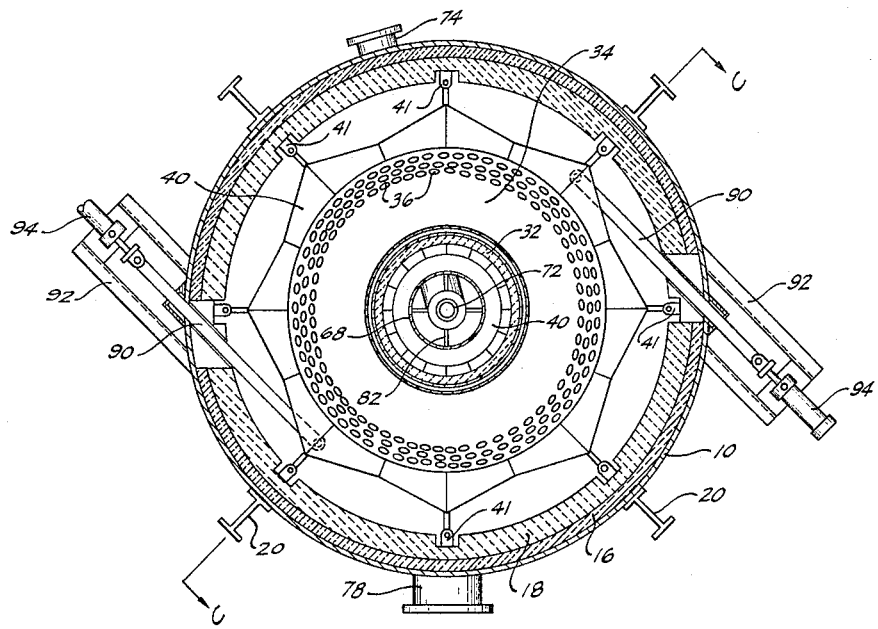
FIGURE 2 is a view of the entire kiln horizontal cross-section taken on line A—A of FIGURE 1 showing the internal baffles and oscillating mechanism.

Referring now more particularly to FIGURES 1 and 2, the kiln apparatus there shown consists essentially of an elongated solids-downflow hollow vertical shaft kiln with its various internals. The kiln, comprising cylindrical shell 10 having a cover plate 12 and a generally conical bottom 14, is usually constructed of steel, and preferably a temperature-resistant and/or corrosion-resistant material such as Incaloy. As shown, shell 10 is normally insulated for operation at elevated temperatures by the use of a layer of block insulation 16 and firebrick 18, and cover plate 12 is insulated by the use of castable refractory 18. The kiln is supported by means of four support legs 20 attached at evenly spaced intervals around the circumference of cylindrical shell 10. For clarity, the support legs are shown in elevation, but not in cross-section as is the rest of the apparatus illustrated in FIGURE 1. While shell 10 is substantially cylindrical in the preferred form of my apparatus, it can be modified to a non-cylindrical shape as long as internal gas and solids flow symmetry is maintained. Also, the kiln can be tapered from top to bottom to facilitate solids flow by having the upper diameter or cross-section smaller than the lower kiln diameters or cross-sections thus providing an expanding area kiln for the downwardly flowing solids.

The conical bottom 14 of the kiln, illustrated as extremely elongated in this preferred embodiment, permits the processing of solid materials which flow with difficulty. Usually, the conical bottom 14 is designed to handle solids having an internal angle of flow as low as 15° or lower from the vertical. Cover plate 12 is provided with four uniformly spaced solids delivery conduits 22 which communicate with feed hopper 24 having an upper solids inlet conduit 26. Typically, there is a vane feeder (not illustrated) mounted on top of solids feed inlet conduit 26 which isolates the top of the kiln from the environment and prevents either gas entry or exit from the top of the kiln via solids feed inlet conduit 26. Solids feed hopper 24 usually contains a conventional solids level indicator (not illustrated) which controls the solids level in solids feed hopper 24 by actuating a conventional vibratory discharge feeder (not illustrated) attached at the bottom of the kiln below solids outlet conduit 28, which conduit 28 is attached to the bottom of conical bottom 14.

The foregoing constitute conventional elements found in many vertical shaft kilns. According to my invention, a novel internal apparatus arrangement is provided in the form of a gas-fired burner 30, fueled by conventional combustible gas conduits (not illustrated), which is mounted centrally on cover plate 12. Of course, other burners may be used in place of burner 30 such as oil-fired burners and the like. Surrounding the outlet of burner 30 is vertical refractory-lined burner tube 32, usually about two feet in diameter, extending centrally downwardly into the upper portion of the space enclosed by shell 10. Burner tube 32 and burner 30 are supported from the structural support members of cover plate 12. Any heat loss from burner 30 or burner tube 32 goes directly into the solids bed surrounding them, thus providing very efficient utilization of the heat generated.

Spaced below burner tube 32 is inverted conical gas distributor 34 having evenly spaced perforations 36 arranged to give about a 50 percent open area in the surface of gas distributor 34. These perforations 36 provide a large gas engaging area for the treating fluid passing upwardly from gas distributor 34. Conical gas distributor 34 is substantially smaller at its largest bottom diameter than the internal wall surface of the kiln formed by firebrick 18. The smallest top diameter of conical distributor 34 is attached to ring 38 which extends vertically a short distance above the bottom outside edge of burner tube 32. Ring 38 is spaced apart slightly from the outer surface of burner tube 32 so that the hereinafter described oscillatory motion of conical gas distributor 34 can take place, but close enough so that there is no appreciable gas flow between ring 38 and burner tube 32. Spaced apart from and below gas distributor 34 is inverted conical solids baffle 40 whose largest diameter is substantially larger than the bottom diameter of distributor 34. The top conical portion of solids baffle 40 fits centrally within the lower portion of distributor 34 and is spaced apart therefrom to form a conical annulus between the inner surface of distributor 34 and the outer surface of baffle 40. Conical solids baffle 40 has a corrugated surface to provide structural stability and a surface which will engage the surrounding solids bed during operation of the oscillating mechanism. The scalloped bottom periphery of baffle 40 provides closeness to shell 10 at the support points, and also provides the required open area needed for solids flow.

Figure 3:
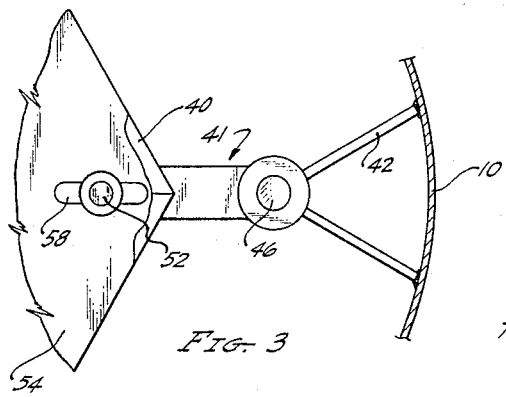
FIGURE 3 is an enlarged plan view of the pivot arm assembly which supports the oscillating conical internals in the kiln.
Figure 4:
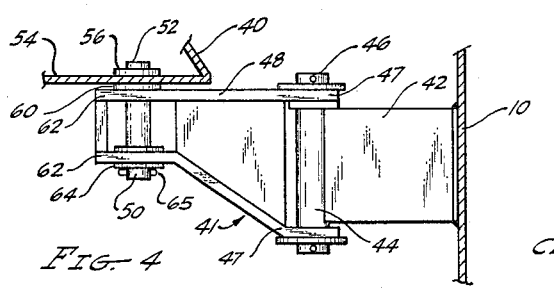
FIGURE 4 is an elevational view of the pivot arm assembly shown in FIGURE 3.

The bottom periphery of baffle 40 is pivotally supported from shell 10 by eight pivot assemblies 41, shown in detail in FIGURES 3 and 4, comprising angular bracket 42 attached to shell 10 at the open end and having a receptacle 44 to receive pin 46 at the apex end. Pin 46 passes through receptacle 44 and aligned holes in the outer end 47 of pivot arm 48. Pivot arm 48 extends inwardly from outer end 47 towards the center of the kiln. Washers are located between the head of pin 46 and pivot arm 48. Pivot arm 48 has vertically aligned holes in the horizontal surfaces formed by the U-shaped inner end 62 of pivot arm 48 which receive sliding pin 50. Pin 50, having an enlarged head 52, fits into the holes in the U-shaped inner end of pivot arm 48. The outer skirt edge of baffle 40 has a horizontal brace 54 which connects baffle 40 to pivot arm 48. Pin 50 passes through washer 56, slot 58 in brace 54, washer 60, holes in inner end 62 of pivot arm 48, and washer 64 wherein enlarged head 52 seats on washer 56. A cotter pin 65 holds pin 50 in place. Slot 58 is slightly larger in width than the diameter of pin 50 thus providing an easy sliding movement for pin 50 in slot 58 during oscillation of the internals.

Figure 5:
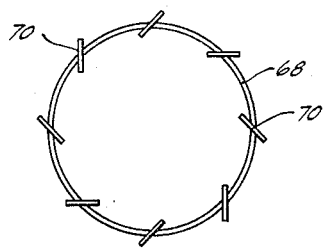
FIGURE 5 is a view, in full horizontal cross-section of the recirculating gas entry into the burning zone located beneath the fired burner, taken on line B—B, thus illustrating the vane arrangement.

Baffle 40 and gas distributor 34 are both movably supported on pivot arms 48 since spacing cross braces 67 and 69 attach baffle 40 and gas distributor 34 to each other and to the aspirator conduit comprising lower tapered tube 66 and upper cylindrical tube 68. This oscillating internal assembly serves primarily as a gas circulator, solids flow inducer, and a solids plugging minimizer. Cylindrical tube 68 has an upper outlet comprising vertical support vanes 70 capped by conical refractory cap 71. Upper cylindrical tube 68 is substantially smaller in outer diameter than the inner diameter of burner tube 32 and extends upwardly therein a substantial distance. Thus, an annular hot flue gas flow space is formed between burner tube 32 and upper cylindrical tube 68. Vanes 70, as shown in FIGURE 5, are set at an angle of 45° to a tangent to the circumference of cylindrical tube 68, thus providing a physical system which induces swirling of the gases passing through vane 70.

Vertical aspirator nozzle 72 is attached to fluid injection conduit 74 which enters the kiln through shell 10 at a point just below pivot assemblies 41. The tip of vertical aspirator nozzle 72 protrudes upwardly slightly past the bottom edge of lower tapered tube 66 and is centrally located therein. Spacer supports 82 hold the tip of nozzle 72 in substantial alignment with the central axis of the kiln to form an aspirating assembly which draws gases from below lower tapered tube 66 when a jet stream of fluid is injected into the kiln via fluid injection conduit 74 and aspirator nozzle 72. Alternately, a high temperature fan or other gas circulation means could be used in place of the aspirating assembly illustrated to provide the internal revolving gas circulation characteristic of my kiln operation.

Located near the top of shell 10 is gas outlet conduit 76 which conducts the treating fluids and product fluids from the kiln interior to product gas treatment facilities. The subsequent operations, in which typically a steam-flue gas mixture is cooled, purified, and conditioned, are similar to those conventionally used for the volatile products from byproduct coke ovens and the like. At the bottom of shell 10 where conical bottom 14 attaches, cooling gas conduit 78 opens into the annular space between cooling hopper 80 and conical bottom 14. Cooling hopper 80 is also conical and has a large diameter substantially the same as the inner kiln diameter and a small diameter sufficient to provide enough vertical height that the annulus between hopper 80 and conical bottom 14 provides space for cooling gas ingress and engagement with the solids flowing downwardly through the kiln. Although conduits 74, 76, and 78 are shown in cross-section in FIGURE 1 for clarity, note that the orientation of these conduits is different in the horizontal cross-section of FIGURE 2. The actual section of the kiln shown in FIGURE 1 would be the section taken on line C—C of FIGURE 2.

As shown in FIGURE 2, oscillatory motion is transmitted to the internals (baffle 40, gas distributor 34, lower tapered tube 66, and upper cylindrical tube 68) by two conventional hydraulic drive mechanisms 94 which are attached to the kiln by means of drive nozzles 92. The drive shaft 90 is connected to the driver of each hydraulic drive mechanism 94 at one end and is attached at the other end to that portion of pin 50 located in the bight of the U formed by the inner end 62 of pivot arm 48. Thus, a back and forth oscillatory motion, with a stroke length controlled by adjustment of hydraulic drive mechanism 94, is transmitted to the internal cones and thus to solids flowing past these cones (baffle 40 and gas distributor 34). If the flow of coke through the kiln is substantially continuous, then the hydraulic drive mechanism 94 should be operated continuously, and even with intermittent (semi-continuous) solids flow the continuous oscillation of the internals may be maintained. A typical stroke length for hydraulic drive mechanism 94 is about 3 inches, but greater or smaller stroke lengths are satisfactory. Also, drive means other than the hydraulic drive illustrated are satisfactory since the motion transmitted is a simple back and forth action. Furthermore, an intermittent or continuous rotary motion for the internals is satisfactory if desired.

Alternatively, a level controller installed in feed hopper 24 can actuate a vibratory chute feeder or other solids discharge device on an on-off basis, i.e., when the level of solids rises a few inches in feed hopper 24, the vibratory chute feeder would be turned on. At the same time, the hydraulic drive mechanism 94 which actuates the oscillation of gas distributor 34 and baffle 40, would be turned on thus oscillating the internals one way and then the other as long as there is solids flow through the kiln. When the coke level in feed hopper 24 drops to the desired point, the level controller shuts off the vibratory feeder on the solids discharge and at the same time shuts off hydraulic drive mechanism 94 so that the internals (gas distributor 34 and baffle 40) will not oscillate against the temporarily stagnant bed of coke in the kiln.

The above and other objects and advantages of the invention will become more apparent from the following description of an exemplary embodiment of the invention performed in an apparatus substantially identical to that shown in the drawings. For the purpose of illustrating a preferred embodiment, the present invention will be described with particular reference to a six and one-half foot diameter vertical shaft kiln for calcining green coke. The kiln herein operates both as a green coke calcining unit and a fiinished coke cooling unit. Application of the same kiln, or obvious modifications thereof, to the treatment or conversion of other solids will be obvious to those skilled in the art. The solids feed is a green (partially treated) coke which typically has a particle size of between about 1/8 inch and 4 inches in diameter. However, the solids particle feed can be smaller or much larger in size. This green coke usually contains between about 10 and about 14 weight percent of volatile material. The coke feed, at a temperature of about 1,200° F. and a rate of about 3.4 tons of coke per hour, enters feed hopper 24 through solids inlet conduit 26. A coke solids level is automatically maintained in feed hopper 24 by a level controller (not shown) which controls a vibratory feeder discharge (not shown) at the bottom of the kiln, i.e., below solids outlet conduit 28.

The coke flows gravitationally in dense phase down through solids delivery conduits 22 into the kiln proper. The coke solids essentially fill the annulus space between firebrick 18 and the kiln internals, i.e., burner tube 32, gas distributor 34, and baffle 40, except for those void spaces formed by the angle of repose of the flowing solids.

The angle of repose of the flowing coke forms a gas space (1) between the bottom of solids delivery conduits 22 and castable refractory 18 located beneath cover plate 12, (2) in the annulus between gas distributor 34 and baffle 40 above the bottom periphery of gas distributor 34, and (3) in the interior of baffle 40 above the bottom periphery of baffle 40. The lower part of the kiln is then filled completely with coke until the bottom of cooling hopper 80 is reached. Again the angle of repose of the flowing coke forms a gas space in the annulus between cooling hopper 80 and the upper portion of conical bottom 14. Conical bottom 14 is then filled completely with coke down through solids outlet conduit 28. Finished coke is discharged from solids outlet conduit 28 at the rate of about 3 tons per hour. The flow of coke from the kiln is conventionally restricted at the bottom of solids outlet conduit 28 by valve discharge means (not shown) such as a vibratory feeder, vane feeder, or the like. Thus, essentially the entire kiln is filled with particulate coke except for the space occupied by the internals and the voids caused by the geometery of the kiln internals.

Temperatures in the central heating section of the kiln are maintained by means of gas-fired burner 30 which fires down through the centrally located refractory lined burner tube 32. Fuel and air are conducted to burner 30 by conventional conduits (not shown). The flue gases emanating from burner 30 are typically at a temperature of about 2,700° F., but these flue gases are tempered by blending with the recycling steam and flue gas stream flowing upwardly in upper cylindrical tube 68 and out through vanes 70. The blended hot flue gases and the recycle stream, now at a temperature of about 1,800° F., flow downwardly through the annulus formed by gas distributor 34 and baffle 40. Gas distributor 34 is provided with perforations 36 through which an exiting portion of the blended hot gases pass upwardly to calcine and subsequently preheat the downwardly flowing coke by countercurrent heat exchange. These blend gases which have passed upwardly through the coke bed from gas distributor 34 are disengaged at the top surface of the coke bed just below the bottom of solids delivery conduits 22 and pass into the gas space between the coke bed surface and castable refractory 18. These product gases are then withdrawn from this gas space at the top of the kiln via gas outlet conduit 76.

The recycling portion of the gases flowing downwardly through the annulus formed by gas distributor 34 and baffle 40 continue downwardly from the bottom periphery of gas distributor 34. This recycled portion of the gases travels cocurrently with the downwardly flowing coke in the annulus formed by firebrick 18 and baffle 40. This cocurrent calcining zone provides uniformity of heating at substantially constant temperature throughout the cocurrent solids and gas contacting annulus. The rapidly recycling gases pass downwardly around the bottom periphery of baffle 40 and then are swept upwardly again in recycle flow by the aspirating effect of aspirator nozzle 72.

Entering through fluid injection conduit 74 is about 750 cubic feet per minute of about 2 p.s.i.g. steam and flue gas which is ejected into the klin via aspirator nozzle 72. This gas flow through aspirator nozzle 72 causes the circulation of from 6,000 to 10,000 cubic feet per minute of the same gas through the burner combustion area via lower tapered tube 66, upper cylindrical tube 68, and vanes 70 and thence downwardly through the coke bed in the aforementioned annular cocurrent calcining zone and back into the bottom of lower tapered tube 66 where the aspiration starts the recycle over again. This recycling gas stream provides excellent mixing and contacting of the hot gases and the coke, thus creating a cocurrent gas-solid heat exchange zone of complete uniformity of temperature.

Low temperature steam enters the kiln via cooling gas conduit 78 and passes downwardly through the annulus formed by cooling hopper 80 and the upper portion of conical bottom 14. Most of this cooling steam passes around the bottom periphery of cooling hopper 80 and upwardly through approximately six feet of the downwardly flowing coke bed, thus cooling the descending hot coke and being countercurrently heated thereby in passage upwardly through the kiln. This steam rising from the cooling section is aspirated by the previously described effect of aspirator nozzle 72 into the bottom of lower tapered tube 66, passes through the previously described revolving heat exchange section, and thence passes upwardly through the countercurrent heat exchange section in the top of the kiln to gas outlet conduit 76 where it is withdrawn as a part of the gaseous product stream.

The gases leaving the kiln via gas outlet conduit 76 pass through a direct water quench where the high temperature of the product gas generates large quantities of steam. Excess steam is vented and a first blower, about 20 horsepower, recycles the remaining quantity of steam and gas (about 3,000 cubic feet per minute at about 1 p.s.i.g.) back to the kiln. A second booster blower, about 10 horsepower, takes a portion of this one p.s.i.g. gas stream as suction, raises its pressure to about 2 p.s.i.g., and introduces it to the kiln through fluid injection conduit 74 thus actuating the aspirating unit (vertical aspirator nozzle 72). The balance of the steam-gas from the first blower is returned to the kiln via cooling gas conduit 78, i.e., this stream, at a temperature of about 212° F., is the cooling stream entering the bottom of the kiln via cooling gas conduit 78. A mist or vapor removal and entrainment device can be used for removal of coal tar mist if desired, e.g., a type W Rotoclone, prior to water quenching. When raw coal is treated, a mist collector is required because of entrained oil. A typical water quench system can use a type N Rotoclone which is essentially a direct water quench device.

The coke solids in the process enter at a temperature between about 800° F. and about 1,200° F. and are raised in temperature to a high point of about 1,800° F. in the cocurrent heat exchange zone. Of course, at these temperatures, there can be some water gas reaction taking place between the hot carbon and hot steam. As the solids continue downwardly past the bottom periphery of baffle 40, the cooling effect of the upwardly rising low temperature steam reduces the coke temperature to about 300° F. as it exists from solids outlet conduit 28.

A minor portion of the cooling steam passes downwardly from cooling gas conduit 78 through the descending coke bed in conical bottom 14 and is discharged with the cool coke through solids outlet conduit 28. Solids outlet conduit 28 here acts as a sealing leg and normally permits the escape of less than about five percent of the circulating flow of gas through the kiln. This sealing leg gas, of course, may be recirculated or treated for the recovery of components thereof. If it is desired to reduce the loss of gas at this point, solids outlet conduit 28 can be elongated.

The kiln normally operates with more gas heat capacity in terms of total gas and steam flow upwardly than the heat capacity of the solids moving downwardly in the bottom section of the kiln. Thus, for optimum operation, the gas system can circulate appreciably more gas than the required heat capacity, but enough gas should always be circulated to effect cooling in this preferred embodiment. Thus, this example illustrates a design which circulates about 3,000 cubic feet per minute of a steam-flue gas mixture comprising about 66 percent steam, about 33 percent flue gas, and about 1 percent of volatile product gases from the calcining operation. The amount of gas liberated from the coke in calcining is variable, but can run as much as 4,000 to 5,000 cubic feet of gas liberated per ton of coke calcined.

The revolving gas stream in the cocurrent heat exchange zone is an especially efficacious feature of my invention. Since the heating gas stream is travelling in a cocurrent direction at a relatively high velocity, appreciable pressure drop can be built up across the coke bed which helps solids flow rather than oppose it as in conventional countercurrent calcining zones.

An alternate method of operation using the kiln apparatus of this invention involves the use of direct coke or other fuel combustion in the kiln to supplement or replace the gas burner heating heretofore described. An air blower would supply air to the steam-flue gas mixture passing through the jet of the aspirator nozzle, and the quantity of air would be adjusted to maintain the desired temperature in the cocurrent heat exchange zone. Combustion of coke or other fuel would then occur in the annular area where there is rapid gas flow and maximum temperature. Steam and flue gases would, of course, pass upwardly as previously described from gas distributor 34 to carry out the additional heating and retorting in the upper countercurrent heat exchange heating zone.

My continuous vertical solids heat treating kiln and solids treatment methods incorporate features most attractive to the processing industry. Some of the more significant features include: (1) oscillation or rotation of a centrally located heating gas introduction means thus providing uniform heating while minimizing agglomeration and channeling of gas and solids; (2) removal of hydrocarbon or product gas, flue gas, and steam overhead with no gross downward flow or removal of such gases from the kiln prior to final overhead removal, thus providing maximum hydrocarbon recovery; (3) an annular cocurrent solid and gas heat exchange zone with countercurrent gas and solids heat exchange zones above and below this cocurrent heat exchange zone thus providing optimum efficiency in preheating of solids, optimum efficiency in the cooling of solids, and the most effective and uniform calcining of solids in the heating zone of the kiln; (4) precise gas circulation and temperature control by aspiration or injection of a controlled volume and temperature gas stream into the circulating heating gas stream in the cocurrent gas and solids heat exchange zone of the kiln; (5) steam cooling of the calcined coke before withdrawal from the kiln wherein the cooling steam is integrated into the calcining fluid in the cocurrent heat exchange zone; and (6) constant tempering of the high temperature burner flue gases with a recirculating gas stream in the cocurrent gas and solids heat exchange zone.

Various other changes and modifications of this invention are apparent from the description of this invention and further modifications will be obvious to those skilled in the art. Such modifications and changes are intended to be included within the scope of this invention as defined by the following claims:

I claim:

1. A process for treating solids with gases which comprises:

passing solids downwardly in the form of a dense bed from a solids feed zone successively through a solids preheating first countercurrent gas-solid contacting zone, a solids heating cocurrent gas-solid contacting zone, and a solids cooling and first treating fluid preheating second countercurrent gas-solid contacting zone;

passing a first treating fluid upwardly through said second countercurrent gas-solid contacting zone;

generating a hot flue gas;

mixing said stream of hot gas with a recycle fluid stream out of contact with said solids to form a mixed treating fluid;

passing a recycle portion of said mixed treating fluid stream cocurrently with said solids in said cocurrent gas-solid contacting zone;

passing a withdrawal portion of said mixed treating fluid stream upwardly from said cocurrent gas-solid contacting zone through said first countercurrent gas-solid contacting zone;

mixing said first treating fluid after passage through said second countercurrent gas-solid contacting zone with said recycle portion of said mixed treating fluid after passage through said cocurrent gas-solid contacting zone to form said recycle fluid stream;

circulating said recycle fluid stream toward said stream of hot flue gas out of contact with said solids;

removing said withdrawal portion of said mixed treating fluid from the top of said first countercurrent gas-solid contacting zone; and withdrawing treated solids from the bottom of said second countercurrent gas-solid contacting zone.

2. A process as defined to claim 1 wherein said solids comprise a hydrocarbonaceous material.

3. A process as defined in claim 2 wherein said hydrocarbonaceous material is coal.

4. A process as defined in claim 2 wherein said hydrocarbonaceous material is coke.

5. The process of claim 1 wherein said recycle fluid stream is circulated upwardly by contacting said recycle fluid stream with an aspirator fluid stream.

6. The process of claim 1 wherein said hot flue gas is generated by a gas fired burner centrally located within said first countercurrent gas-solid contacting zone and swirling movement is imparted to said mixed treating fluid.

7. A process as defined in claim 1 wherein the solids passing downwardly through said cocurrent gas-solid contacting zone are mechanically agitated during passage therethrough.

8. A process as defined in claim 7 wherein said mechanical agitation is an oscillatory motion transverse to the direction of solids flow.

9. A process as defined in claim 1 wherein said solids pass downwardly continuously.

10. A process as defined in claim 1 wherein said solids pass downwardly semi-continuously.

11. A process as defined in claim 7 wherein said solids pass downwardly semi-continuously, and wherein only when said solids are moving downwardly are said solids passing through said cocurrent gas-solid contacting zone mechanically agitated.

12. A process as defined in claim 1 wherein said solids comprise combustible material; wherein the temperature in said cocurrent gas-solid contacting zone is elevated sufficiently to maintain combustion; and wherein said mixed treating fluid is heated internally within said cocurrent gas-solid contacting zone by the addition of an oxygen-containing gas to said mixed treating fluid stream in an amount sufficient to support combustion of a portion of said combustible material.

13. In a solids treating kiln, such as a coke calcining kiln or the like, in combination:

an elongated hollow vertically extending shaft having at least one solids inlet at the top and a solids outlet at the bottom, said shaft being adapted to permit granular solids to flow downwardly therein;

cooling gas inlet means opening into said shaft adjacent the bottom thereof and being adapted to introduce cooling gas into the solids bed flowing downwardly through said shaft;

product gas outlet means located adjacent the top of said shaft for removing product and treating gas from said shaft;

heating means located substantially centrally in the upper portion of said shaft;

an elongated hollow combustion tube having an open bottom end and depending downwardly from said heating means, said combustion tube being adapted to conduct hot flue gases downwardly from said heating means;

hollow conical gas distributing means having a small upper diameter open top, located substantially centrally in said shaft adjacent to the bottom of said combustion tube and depending downwardly and outwardly therefrom, and spaced evenly apart from said shaft sufficiently to provide space for solids and gas flow, said small upper diameter open top of distributing means communicating and substantially registering with said open bottom end of said combustion tube;

hollow conical solids baffle means having an open small diameter top and a larger diameter bottom periphery located centrally in said shaft below, partially within, attached to, and spaced evenly apart from said gas distributing means, said bottom periphery of said solids baffle means being spaced evenly apart from said shaft sufficiently to provide annular space for solids and gas flow, said open top of solids baffle means communicating and substantially registering with said open bottom end of said combustion tube;

multiple support means movably attached to the periphery of said hollow conical solids baffle means and to said shaft;

mechanical agitation means connected to said solids baffle means for moving said gas distributing means and said solids baffle means within said shaft; and gas circulation means located adjacent to the hollow bottom of said solids baffle means and located centrally within said shaft for circulating gases successively upwardly through the interior of said solids baffle means into said bottom end of said combination tube, downwardly annularly between said gas distributing means and said solids baffle means, and downwardly annularly between said shaft and said solid baffle means.

14. A solids treating kiln as described in claim 13 wherein said heating means comprises a gas-fired burner.

15. A solids treating kiln as described in claim 13 wherein said multiple support means are movably attached by means of pivotal support means and wherein said mechanical agitation means comprise oscillating power means connected to said solids baffle means for horizontally oscillating said gas distributing means and said solids baffle means within said shaft.

16. A solids treating kiln as described in claim 13 wherein said gas circulation means comprises an aspirating nozzle means centrally located within and adjacent the bottom of the hollow of said solids baffle means, said aspirating nozzle means having its opening pointing upwardly substantially vertically and being connected to an aspirating fluid conduit means which passes aspirating gas through the wall of said shaft from the exterior to said aspirating nozzle means.

17. A solids treating kiln as described in claim 13 wherein said hollow conical solids baffle means is corrugated radially on the surface of the cone and wherein said lower outer periphery of said solids baffle means is scalloped creating indented and projecting edges, said projecting edges of said scalloped outer periphery providing the attachment points for said multiple support means.

References Cited by the Examiner

UNITED STATES PATENTS

| | | | |
|---|---|---|---|
| 2,044,628 | 6/1936 | O'Toole | 34—164 X |
| 2,464,304 | 3/1949 | Gottlieb | 263—29 |
| 2,667,342 | 1/1954 | Ellerbeck | 263—29 |
| 2,788,961 | 4/1957 | Pooley et al. | 263—29 |

FREDERICK L. MATTESON, JR., *Primary Examiner.*

C. R. REMKE, *Assistant Examiner.*